(12) United States Patent
Huang et al.

(10) Patent No.: US 10,275,129 B2
(45) Date of Patent: *Apr. 30, 2019

(54) METHODS AND APPARATUS FOR A TOUCHSCREEN USER INTERFACE

(71) Applicant: Google Technology Holdings LLC, Mountain View, CA (US)

(72) Inventors: Chen Je Huang, Chicago, IL (US); Gillian Fry, Chicago, IL (US); Carol Lee, Streamwood, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 208 days.

This patent is subject to a terminal disclaimer.

(21) Appl. No.: 14/589,586

(22) Filed: Jan. 5, 2015

(65) Prior Publication Data

US 2015/0121279 A1  Apr. 30, 2015

Related U.S. Application Data

(63) Continuation of application No. 13/027,769, filed on Feb. 15, 2011, now Pat. No. 8,930,841.

(60) Provisional application No. 61/304,633, filed on Feb. 15, 2010.

(51) Int. Cl.
*G06F 3/048* (2013.01)
*G06F 3/0485* (2013.01)
*G06F 3/0488* (2013.01)
*G06F 3/0482* (2013.01)
*G06F 3/0484* (2013.01)

(52) U.S. Cl.
CPC ........ *G06F 3/04842* (2013.01); *G06F 3/0482* (2013.01); *G06F 3/0485* (2013.01); *G06F 3/04883* (2013.01); *G06F 2203/04806* (2013.01)

(58) Field of Classification Search
CPC .......................... G06F 3/04842; G06F 3/0482
USPC ......................................................... 715/771
See application file for complete search history.

(56) References Cited

U.S. PATENT DOCUMENTS

| 8,930,841 B2 | 1/2015 | Huang et al. | |
| 2005/0091596 A1* | 4/2005 | Anthony | G06F 3/04815 715/712 |
| 2006/0156228 A1* | 7/2006 | Gallo | G06F 3/0481 715/202 |

(Continued)

OTHER PUBLICATIONS

Prosecution History from U.S. Appl. No. 13/027,769, dated Mar. 15, 2013 through Sep. 2, 2014, 76 pp.

(Continued)

*Primary Examiner* — Tadesse Hailu
*Assistant Examiner* — Darrin Hope
(74) *Attorney, Agent, or Firm* — McDonnell Boehnen Hulbert & Berghoff LLP (57) ABSTRACT

A touch system user interface displays a plurality of user interface elements in a timeline, wherein each of the user interface elements is associated with a respective event having a number of event attributes, including a date attribute. Each user interface element includes a visual representation of a displayed set of the event attributes and is positioned within the timeline based on the date event attribute. The position and/or spatial zoom level of the user interface elements are modified based on the user input, and the displayed set of event attributes is based on the spatial zoom level.

20 Claims, 10 Drawing Sheets

(56) References Cited

U.S. PATENT DOCUMENTS

| | | |
|---|---|---|
| 2006/0156237 A1* | 7/2006 | Williams .......... G06F 17/30064 715/720 |
| 2007/0060205 A1 | 3/2007 | Kim |
| 2008/0034307 A1* | 2/2008 | Cisler ................... G06F 9/4443 715/764 |
| 2008/0109762 A1 | 5/2008 | Hundal et al. |
| 2008/0209546 A1 | 8/2008 | Kim |
| 2009/0006475 A1 | 1/2009 | Udezue et al. |
| 2010/0070888 A1 | 3/2010 | Watabe et al. |
| 2010/0157742 A1* | 6/2010 | Relyea ................ G04G 9/0082 368/28 |

OTHER PUBLICATIONS

Time Machine (macOS), Wikipedia, Retrieved on Jan. 25, 2017 from https://en.wikipedia.org/w/index.php?title=Time_Machine_(macOS)&oldid=758969155, 5 pgs.

\* cited by examiner

FIG. 19

METHODS AND APPARATUS FOR A TOUCHSCREEN USER INTERFACE

RELATED APPLICATIONS

This application is a continuation of U.S. application Ser. No. 13/027,769, filed Feb. 15, 2011, which claims the benefit of U.S. application Ser. No. 61/304,633, filed Feb. 15, 2010, the entire contents of each of which are incorporated herein by reference.

TECHNICAL FIELD

The subject matter described herein generally relates to user interfaces used in conjunction with touch systems, such as computing devices incorporating touch pads, touchscreens, and the like.

BACKGROUND

Touch systems, such as touchscreen displays, touch pads, and the like, have become an increasingly popular type of input/output device, and are often used in connection with smartphones, e-book readers, table computers, and other such computing devices. At the same time, the advent of social networking sites such as Facebook, Twitter, Google Wave, and the like, along with the increased use of e-mail, on-line calendars, RSS feeds, and other such services, has greatly increased the amount of data that a user must deal with on a day-to-day basis.

One particularly onerous type of data includes notifications relating to various events, such as the receipt of an SMS message, a status update on a social networking site, a received email, a scheduled appointment, etc. Given the number of such events within a typical day, it can be difficult for a user to effectively display and explore past and present event information using currently-known touchscreen user interfaces.

Accordingly, there is a need for improved user interfaces for interacting with mobile devices and other touchscreen-based systems. Other desirable features and characteristics of the present embodiments will become apparent from the subsequent detailed description and the appended claims, taken in conjunction with the accompanying drawings and the foregoing technical field and background.

BRIEF DESCRIPTION OF THE DRAWINGS

A more complete understanding of the various embodiments may be derived by referring to the detailed description and claims when considered in conjunction with the following figures, wherein like reference numbers refer to similar elements throughout the figures.

DETAILED DESCRIPTION

In general, the present invention relates to a touch system user interface wherein a plurality of user interface elements is displayed in a timeline, including a visual representation of a displayed set of the event attributes. The user interface elements are positioned within the timeline based on a date event attribute. The position and/or spatial zoom level of the user interface elements are modified in response to user input (e.g., panning, zooming, etc.), and the displayed set of event attributes is based on the spatial zoom level.

As a preliminary matter, it will be appreciated that the user interface methods described below may be implemented in a variety of devices, including, for example, cellular phones (or "smartphones"), PDAs, GPS systems, e-book readers, tablet computers, netbook computers, point-of-sale devices, gaming devices, pen pads, and any other electronic apparatus that may include a touch system.

Figure 19:
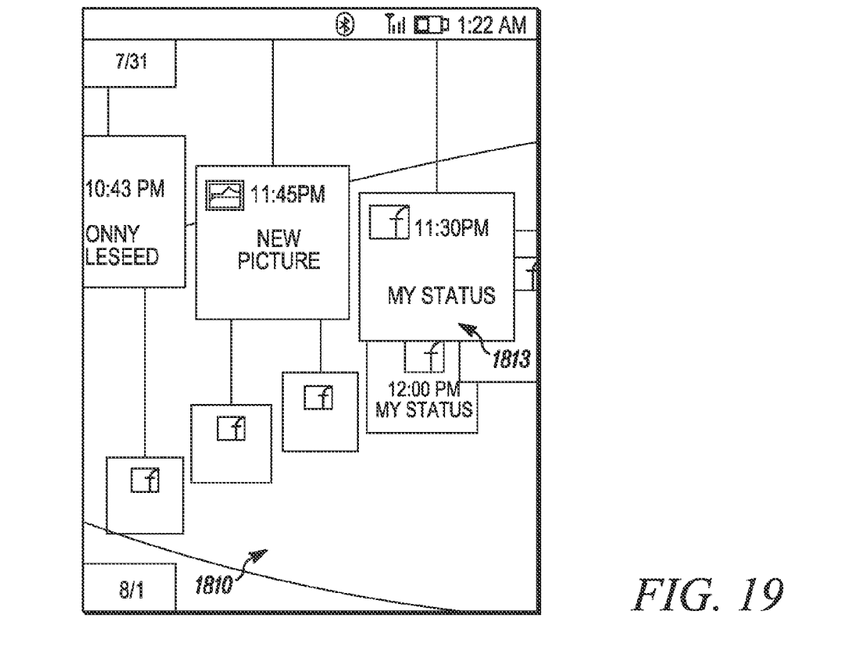

Referring briefly to FIG. 19, for example, a typical mobile device 100 will generally include one or more microprocessors 402, one or more memory devices 404 (e.g., flash memory, hard drives, MicroSD cards, etc.), a power module 406 (e.g., batteries, charging circuits, etc.), a peripheral interface 408, one or more external ports 412 (e.g., USB, Firewire, etc.), an RF transceiver module 415 (e.g., in accordance with IEEE 802.11, Zigbee, etc.), an audio module 416, and one or more sensors such as acceleration sensors 418 (e.g., three-axis sensors), orientation sensors 420, and proximity sensors 422, an IO controller 410, touchscreen displays 114 and 124, and additional I/O components (buttons, LEDs, etc.). In any given embodiment, more or fewer such electronic components may be present.

Touchscreen display 414 is configured to interact with various manipulators, such as a human finger or a stylus. Each type of manipulator, when in contact or close proximity to touchscreen 414, produces a signal that can be received and interpreted as a touch event by processor 402, which is suitably configured (through any combination of hardware and software components) to determine the location and any other selected attributes of the touch event.

Touchscreen display 414 will typically include a thin, transparent touch sensor component superimposed upon a display (e.g., an LCD display or other type of display) viewable by a user. Examples of such displays include capacitive displays, resistive displays, surface acoustic wave (SAW) displays, optical imaging displays, and the like. Display 414 may also provide haptic feedback to the user—e.g., a clicking response or keypress feel in response to a touch event. The present embodiments contemplate any suitable touch sensitive surface or sensor.

Touchscreen display 114 may have any suitable rectilinear or curvilinear shape, and may be oriented in any desired fashion. The illustrated embodiments, without loss of generality, depict rectangular regions oriented in a portrait or landscape orientation (i.e., with respect to a user holding the device); however, the present invention comprehends any range of shapes, sizes, and orientations.

In general, a computer program product in accordance with one embodiment comprises a computer usable medium (e.g., standard RAM, an optical disc, a USB drive, or the like) having computer-readable program code embodied therein, wherein the computer-readable program code is adapted to be executed by processor 102 (working in connection with an operating system) to implement a user interface method as described below. In this regard, the program code may be implemented in any desired language, and may be implemented as machine code, assembly code, byte code, interpretable source code or the like (e.g., via C, C++, Java, Actionscript, Objective-C, Javascript, CSS, XML, etc.).

FIGS. 1-4 depict a user interface in accordance with an exemplary embodiment. As shown, a plurality of user interface elements (e.g., 13) are generally distributed in a timeline 10—in this case, a generally linear timeline extending from left to right (along the x-axis, relative to FIG. 1), and corresponding to a displayed horizontal line 14. Each of the user interface elements 13 is associated with a respective event, such as the receipt of an email, a social networking notification, a calendar event, or the like. Each such event will typically have a number of attributes, such as date (e.g., "Today, 5:00 pm"), location (e.g., "Camelback Mt."), and sender identity ("George"). The number and type of attributes will vary depending upon the nature of the event.

Each user interface element will typically include one or more user interface components. Possible user interface components include, but are not limited to, text objects, text boxes, buttons, check boxes, radio buttons, static images, video images, animations, navigation icons, widgets, windows, drop-down menus, hyperlinks, and any other interactive or non-interactive graphical element.

Figure 1:
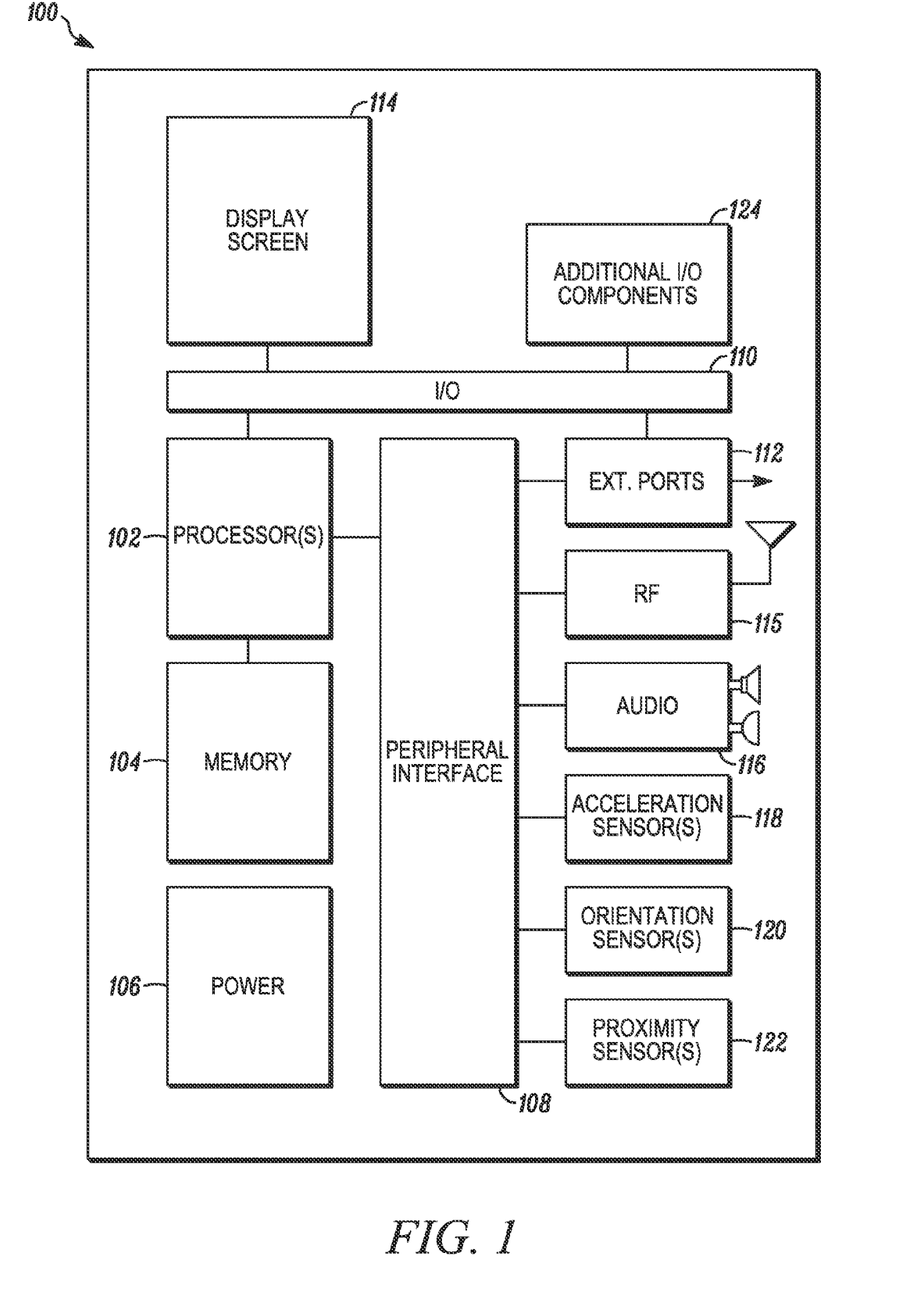
FIG. 1 is a conceptual block diagram of various modules executed by an exemplary processor.
Figure 2:
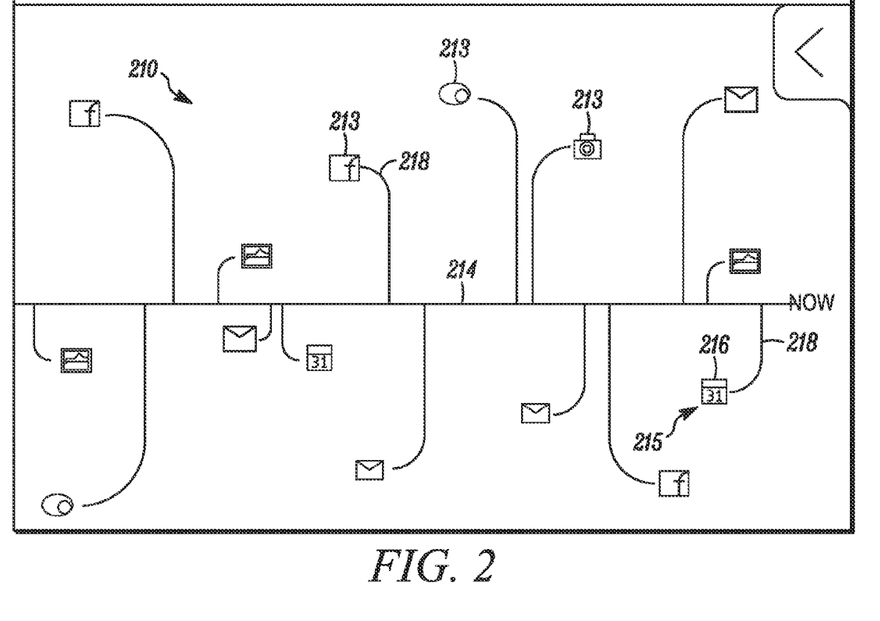
FIGS. 2-5 depict a user interface design in accordance with one embodiment, showing progressive changes in spatial zoom level.
Figure 3:
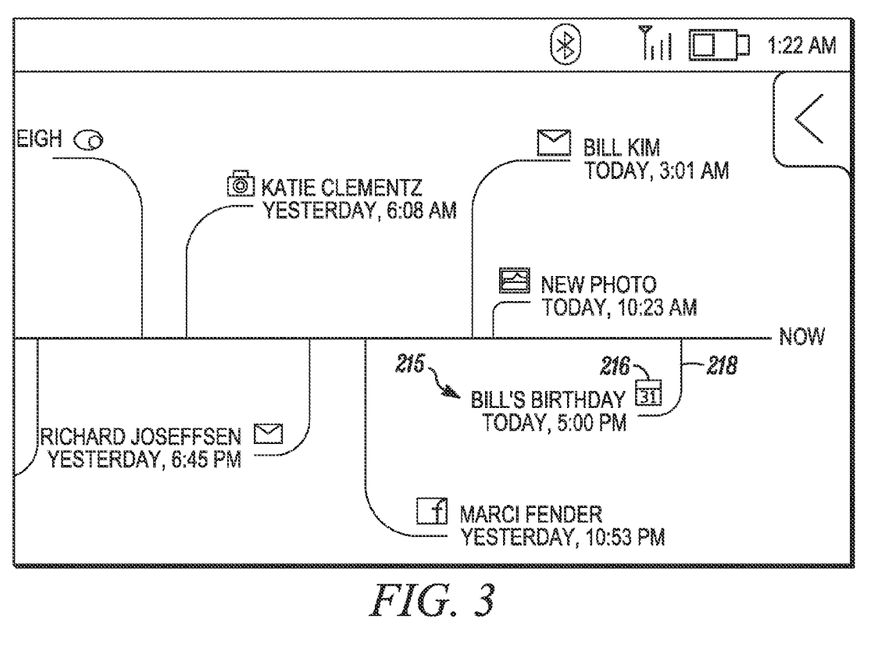
Figure 4:
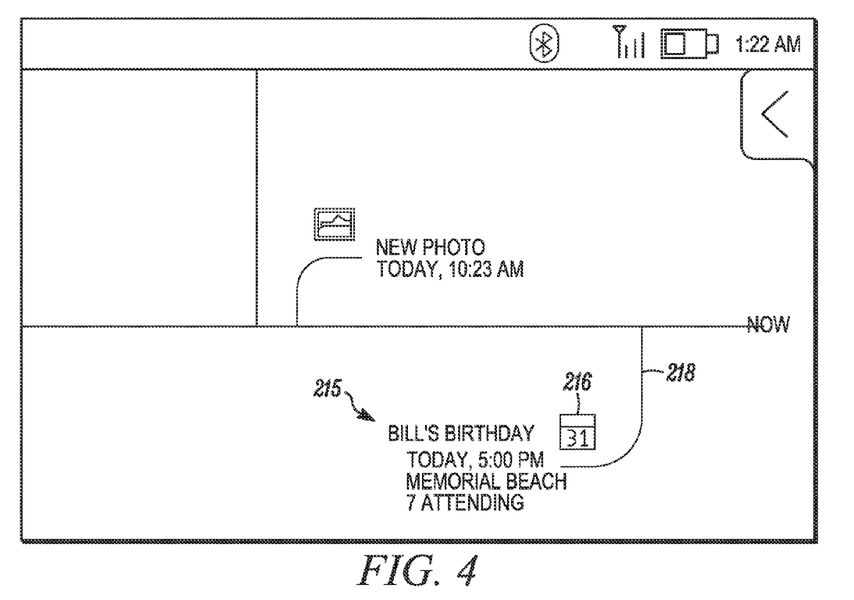

Each user interface element 13 is positioned (either directly or indirectly) within the timeline based on the date event attribute. In FIG. 1, for example, each user interface element (at this zoom level) includes an icon indicating the nature of the event (Facebook, mail, etc.) and an arcuate segment 18 connecting the icon to horizontal line 14. The intersection of arcuate segment 18 with line 14 indicates the relative time that the event occurred. Depending upon the density of the events within any particular displayed segment of timeline 10, the length, curvature, and direction of arcuate segments 18 may vary.

The user interface is capable of accepting user input and then modifying the position and/or spatial zoom level of the user interface elements based on that user input. Such user input might include, but is not limited to, a "swiping" motion in a particular direction (e.g., up, down, left, right, to effect a panning motion), a "pinching" multi-touch input (e.g., to effect zooming in and out), a gestural input (e.g., the movement of a manipulator in a particular geometrical pattern), one or more tapping inputs, etc.

In accordance with one aspect, each user interface element 13 includes a visual representation of a displayed set of the event attributes, and the displayed set of event attributes is based on the spatial zoom level.

FIGS. 1-4, for example, show the same embodiment with progressively higher levels of zoom. As can be seen, the displayed set of event attributes changes (i.e., includes more and more information), as the zoom level increases. Thus, while in FIG. 1 a particular event may be indicated merely by an icon relating to the nature of the event, in FIG. 2, the displayed attributes includes the name of the event ("Bill's Birthday"), along with the date ("Today, 5:00 pm"). Similarly, in FIG. 3 the displayed attributes include the name of the event, the date of the event, as well as the location ("Memorial Beach"), and number of attendees ("7 attending"). Finally, in FIG. 4, all or substantially all attributes of the event are displayed. In addition, real-time information may be incorporated into an event (e.g., weather data, etc.).

While FIGS. 1-4 depict four levels of spatial zoom, the present embodiments are not so limited. The number of spatial zoom levels may be quantized (e.g., five discrete zoom levels), or may be substantially continuous (e.g., ranging from 50% to 400% zoom).

In this regard, the term "spatial zoom" as used herein refers to the effect that visually simulates moving closer to an object in space (or bringing the object closer to the user), rather than simply a "logical" zoom, which may include simply examining more information of an event in response to a tap or click event. The zoom level may be dependent on whether the user has selected for display a portion of the timeline representing a single day or less, or multiply days.

While FIGS. 1-4 depict a right-to-left linear timeline 10, the invention contemplates any type of timeline, regardless of shape, or whether it is depicted as having two or three dimensions (e.g., a parametric curve within a three-dimensional space). Furthermore, in a particular embodiment, the user interface allows the user to configure the interface such that the level of attributes displayed and the graphical nature of the display can be customized with a high level of specificity.

Figure 5:
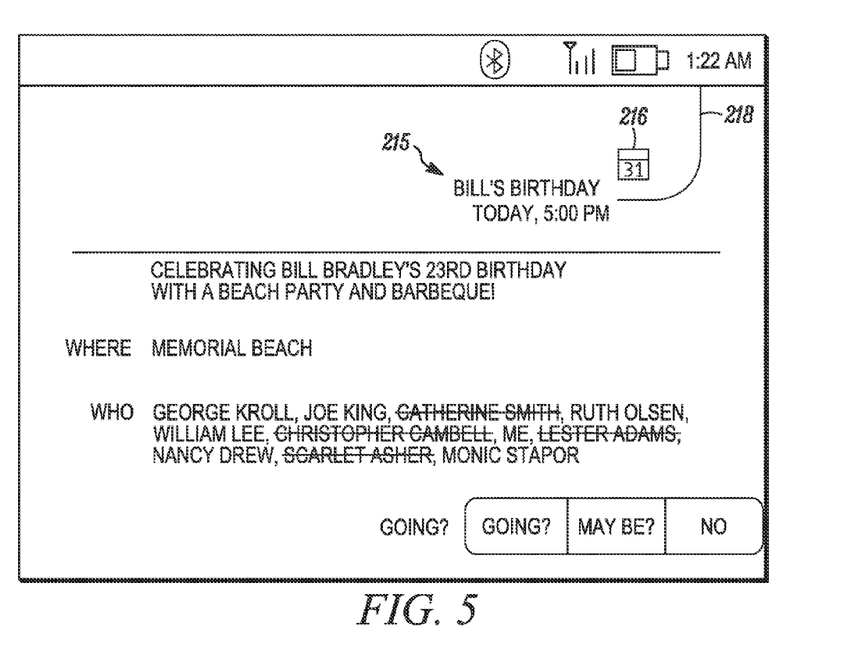
Figure 6:
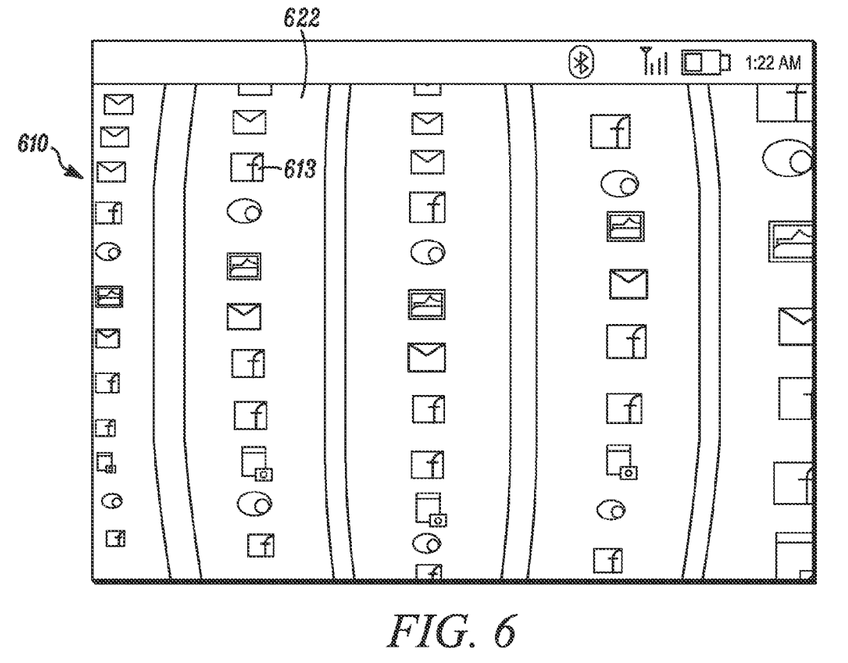
FIGS. 6-8 depict a user interface design in accordance with an alternate embodiment.
Figure 7:
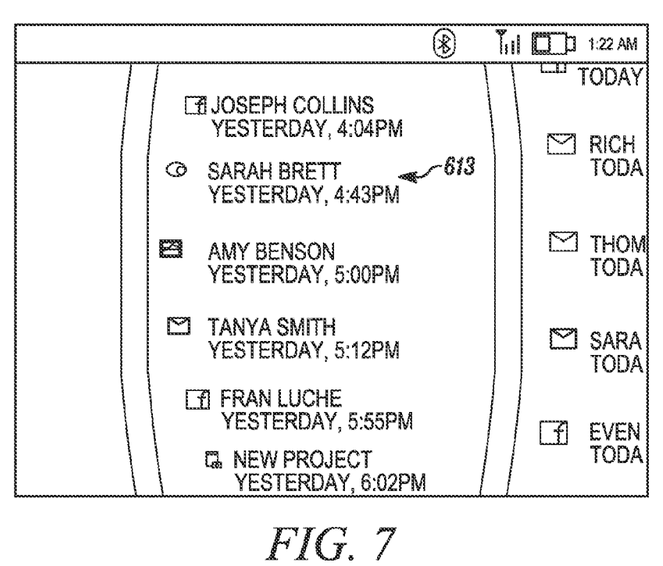

FIGS. 5-6, for example, depict an alternate embodiment, at progressively higher levels of spatial zoom, wherein the user interface elements 13 associated with each event are distributed in vertical "strips" 22. The strips 22 are themselves then distributed along a horizontal timeline 10 from left to right. Stated another way, the timeline 10 indicates gross date information linearly along the x-axis, and fine date information (e.g., for any particular day or week) linearly along a perpendicular y-axis strip 22. Additional visual effects may be incorporated, such as 3D perspective applied to each strip 22, etc. As shown in FIGS. 6 and 7, the set of attributes shown for each element 13 varies depending upon the level of spatial zoom.

Figure 8:
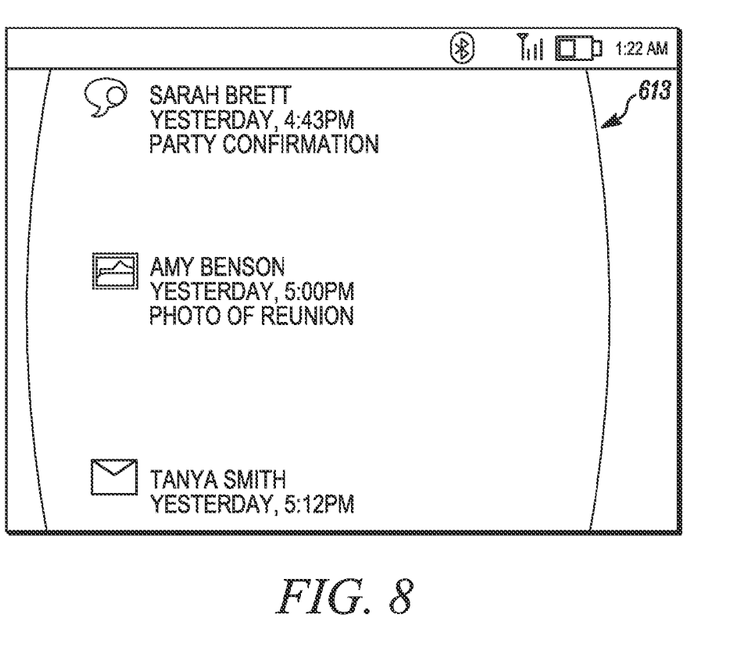
Figure 9:
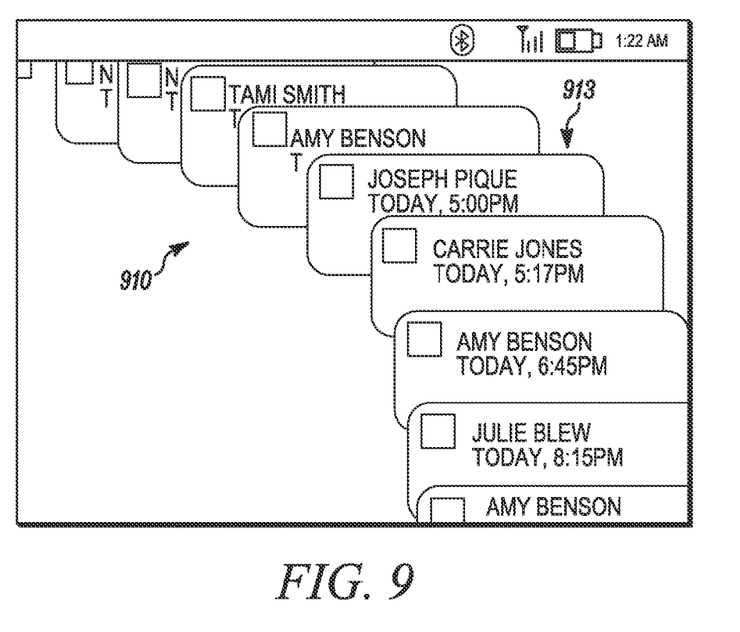
FIGS. 9-11 depict a user interface design in accordance with an alternate embodiment.
Figure 10:
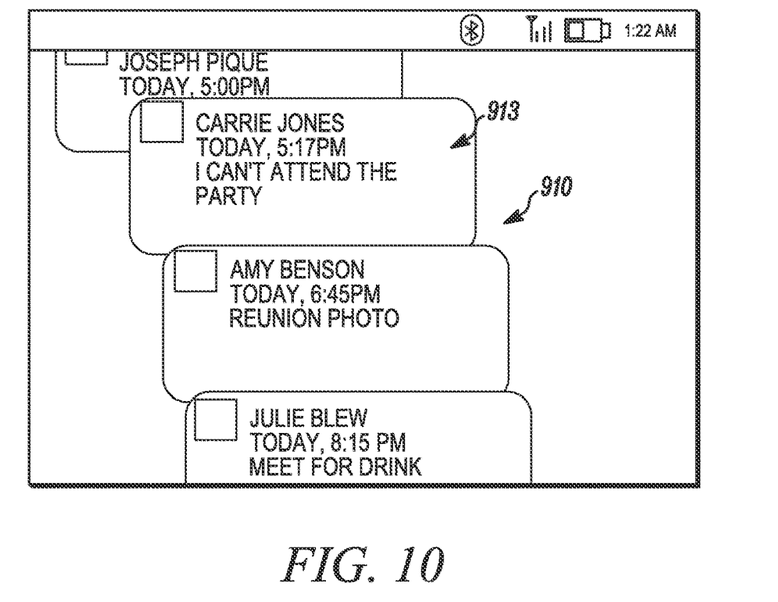
Figure 11:
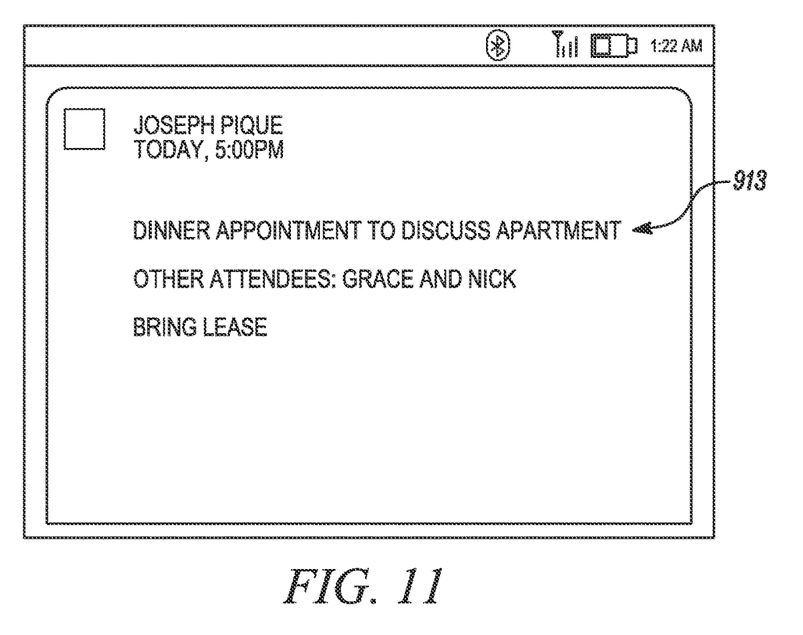
Figure 12:
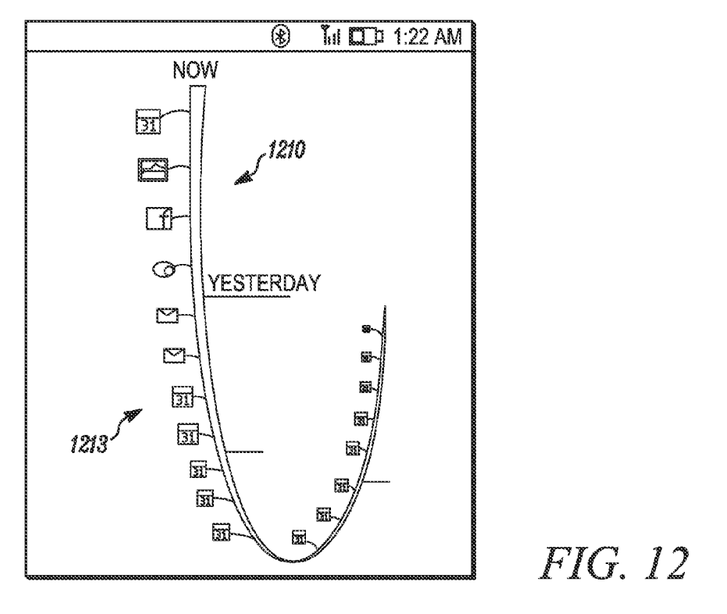
FIGS. 12-15 depict a user interface design in accordance with yet another alternate embodiment.
Figure 13:
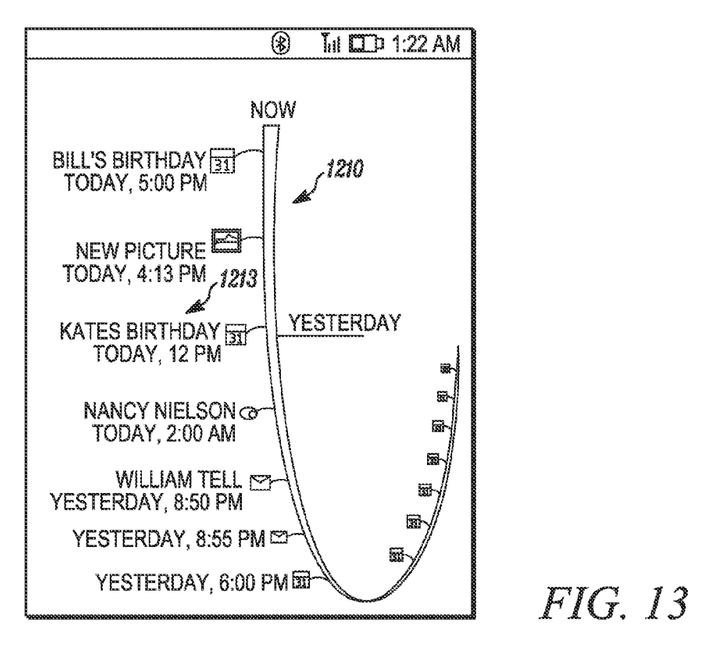
Figure 14:
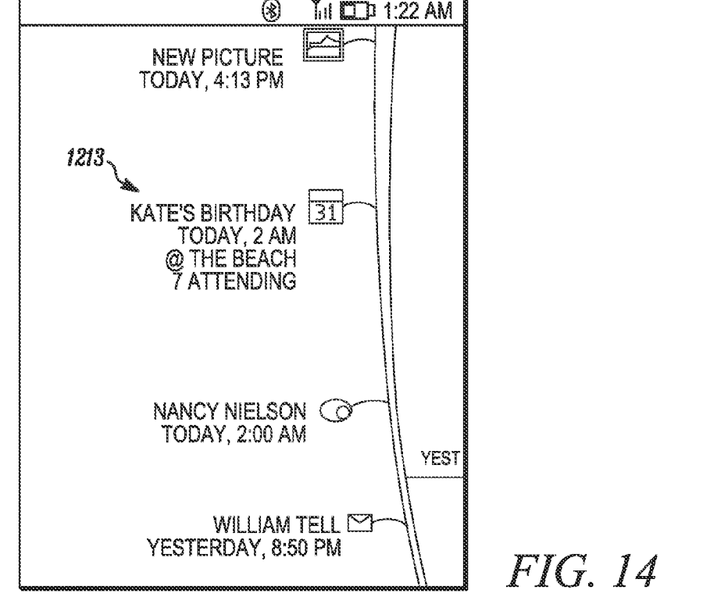

FIGS. 8-10 show an alternate embodiment in which the timeline 10 extends in an arc path such that older events recede into the distance (i.e., a virtual z-axis) and newer events appear closer to the user. Visual effects such as perspective and fading of the graphics may be also added to suggest depth.

FIGS. 11-14 show yet another embodiment, similar in nature to that of the previous embodiment, in which the user interface elements 13 are distributed in a vertically oriented arc, the older events receding into the distance, and the newer events appearing closer to the user.

Figure 15:
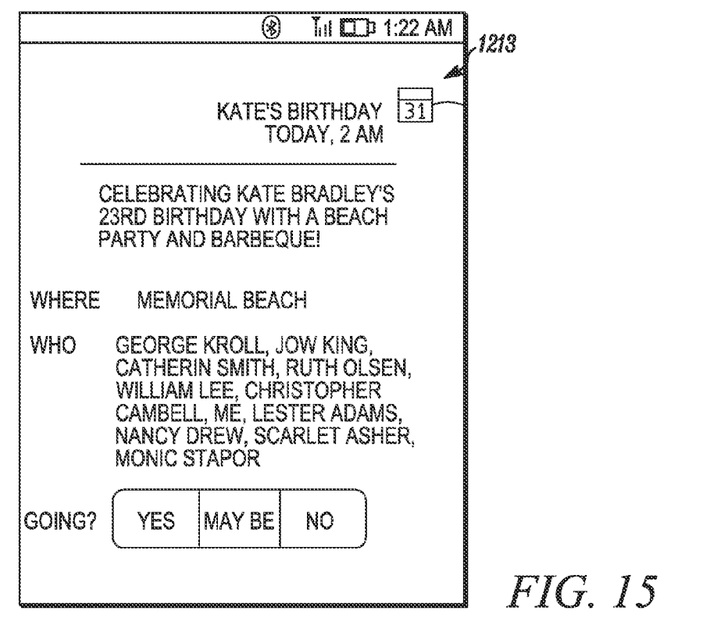
Figure 16:
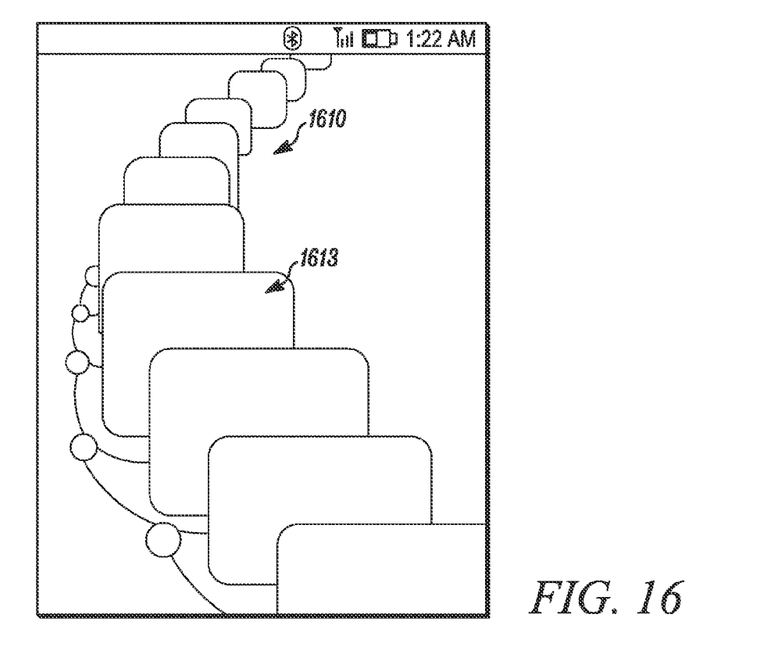
FIGS. 16-17 depict a user interface design in accordance with an alternate embodiment.

FIGS. 15 and 16 depict another embodiment in which the user interface elements recede into the distance (as with FIGS. 8-10), but are interlocked and capable of articulating with respect to each other in response to user input. Other possible articulation schemes include elements that open like a paper fan, a paper lantern, or an item that twists.

Figure 17:
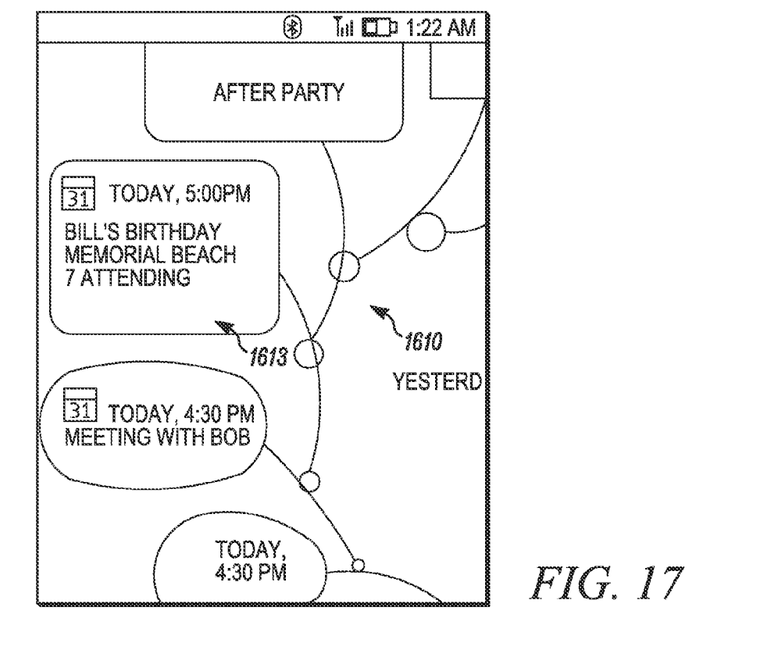
Figure 18:
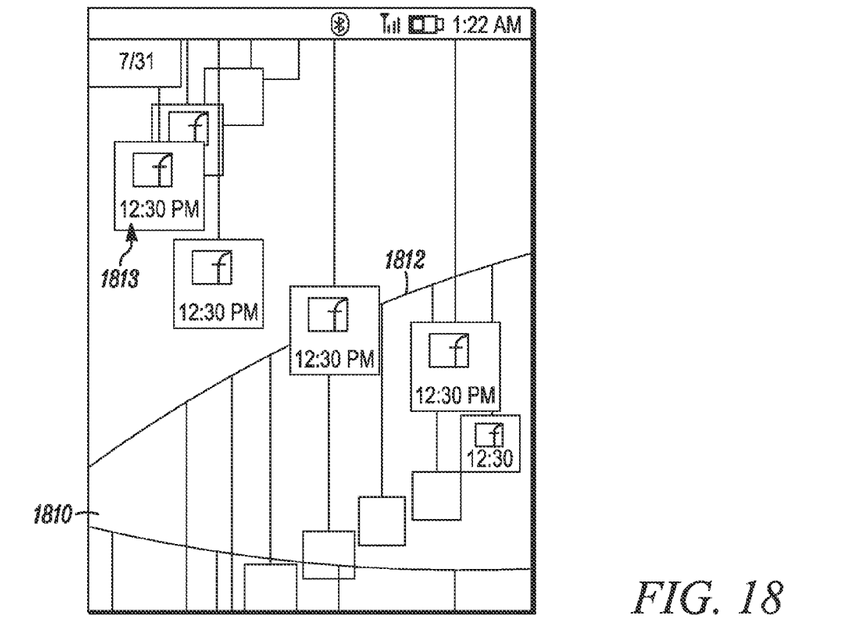
FIGS. 18-19 depict a user interface design in accordance with an alternate embodiment.

FIGS. 17 and 18 show yet another embodiment where the user interface elements are distributed along a vertically oriented helix. Each element is connected by a vertical element to the central helical spine. As shown, the size and apparent brightness of each element 13 varies depending upon its apparent z-axis location, consistent with reflected light from a source close to the user.

In one embodiment, the timeline's parametric curve is a parabolic space fold displaying a sequence of time based elements spanning a current attribute and fading into the screen for a future attribute. In a further embodiment, the parabolic space fold initially starts at the current time period at the front of the parabolic space fold, and the user is able to grab future events and move them forward along the parabolic space fold to move the time span of the curve to be more current.

The events in the forefront of the parabolic space fold may have expanded information content, and as events are moved forward and backward on the space fold, the starting time of the parabolic space shifts forward and backward in time, and the events displayed in expanded form move forward and backward in time, respectively. The start point and the end point of the parabolic space fold may remain on the screen such that the start point and end point of the timeline remain on the screen and can be accessed by selection using a user access.

The timescale used for timeline 10 may vary depending upon the application. In one embodiment, timeline 10 is event based in that each of the elements 13 representing events are arranged equally spaced regardless of the actual time stamp. In another embodiment, on any given axis, the time duration will be fixed—for example, every 24 hours. When there are too many events within the display, the event is suitably distributed to another axis or axes.

In yet another embodiment, however, the time scale for timeline 10 is adjusted automatically. In particular, it is desirable to draw the elements based on their respective time stamps. However, the distance between two events will not always be based on the actual time duration. In such a case, a minimal and maximal bounding distance is employed.

For example, if event A occurs at 2:00 PM, and event B occurs at 2:02 PM, these two events may be drawn such that event B seems to happen at 2:30 PM, because each event occupies the some screen display area. If an event C happens at 4:00 PM, the automatic scaling maintains the relative relationship of these events so the user can easily understand that events A and B happen closer in time than events B and C. However, if event C occurs two weeks later, the system will not base the distance on actual timing as the user would need to scroll through multiple pages to examine event C. Therefore, a maximum boundary distance will be employed so the event C is not drawn too far out in time. The maximal boundary may be, for example, a 12 or 24 hour duration. Within this duration, the events will adjust their relative positions. Later, when a new day starts, the passed event will be fixed in its correct position so the program will not need to constantly calculate its distance and position.

The user interface embodiments described above contemplate that the user may be provided a form of immersion or "virtual reality" experience in the sense that he or she may move through a 3D space, along the timeline, to inspect each event. Alternatively, the user interface may be allowed to "move" the timeline itself, bringing it closer and/or causing it to translate within a plane parallel to the display.

Various other user interface interactivity may be incorporated into the user interface. For example, a user interface element may change from an icon presented on the screen according to its time and date attribute, and selecting the icon reveal the attribute. Further input from the user may result in additional information being revealed.

In one embodiment, the events in the time line include telephone events including missed calls wherein the date event attribute is the time and date of the missed call. The missed call element may include a link that launches a phone application to call back the calling party associated with the missed call when selected. The missed call element may include a link that launches a text message application to the calling party of the missed call when selected.

The events in the timeline may include social networking events, wherein the date event attribute is date and time of the posting. The events in the timeline include calendar information wherein the date event attribute is date and time of a meeting. The events in the timeline may include messages, wherein the date event attribute is date and time that the message was received by the device.

The foregoing detailed description is merely illustrative in nature and is not intended to limit the invention or the application and uses of the invention. Furthermore, there is no intention to be bound by any expressed or implied theory presented in the preceding technical field, background, brief summary or the following detailed description. For the purposes of conciseness, conventional techniques and principles related to touch screen displays, user interface components, and the like, need not be described herein. While at least one example embodiment has been presented in the foregoing detailed description, a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A method comprising:

outputting, by a computing device, for display, a graphical user interface including a visual representation of a timeline and a visual representation of one or more user interface elements positioned along the timeline, wherein each user interface element of the one or more user interface elements is associated with a respective event, each respective event being associated with a respective plurality of attributes including at least one temporal attribute, wherein each user interface element of the one or more user interface elements is positioned along the timeline and at an apparent depth based at least in part on the temporal attribute associated with the respective event such that user interface elements associated with older events are positioned at a greater apparent depth than user interface elements associated with newer events, wherein a respective visual representation of each user interface element from the one or more user interface elements includes information for a first set of attributes from the respective plurality of attributes associated with the respective event;

receiving, by the computing device, an indication of a user input to modify a spatial zoom level of the graphical user interface; and responsive to receiving the indication of the user input:
determining, by the computing device and based on the indication of the user input, a respective updated position along the timeline for each user interface element from at least a portion of the one or more user interface elements;
determining, by the computing device and based on the respective updated position for each user interface element from at least the portion of the one or more user interface elements, a respective second set of attributes from the plurality of attributes associated with the respective event; and
outputting, by the computing device, for display, based on the indication of the user input, an updated visual representation of each user interface element from at least the portion of the one or more user interface elements at the updated position along the timeline, wherein each user interface element from at least the portion of the one or more user interface elements includes information for the respective second set of attributes associated with the respective event, wherein the first set of attributes is different from the second set of attributes.

2. The method of claim 1, wherein the user input indicates an increase in the spatial zoom level, and wherein the visual representation of the first set of event attributes includes an icon indicating a type attribute for the respective event, and wherein the visual representation of the second set of event attributes includes the temporal attribute indicating a time and a date for the respective event.

3. The method of claim 2, wherein the user input is a first user input, the method further comprising:
subsequent to receiving the indication of the first user input, receiving, by the computing device, an indication of a second user input to increase in the spatial zoom level; and
responsive to receiving the indication of the second user input, outputting, by the computing device, for display, based on the indication of the second user input, a further updated visual representation of at least the portion of the one or more user interface elements that includes information for a third set of attributes from the plurality of attributes, wherein the third set of attributes is different from the first set of attributes and the second set of attributes.

4. The method of claim 1, wherein the plurality of attributes includes an event type attribute that is selected from a group consisting of a telephone call event, a social networking event, a calendar event, a text event, an email event, a message event, a photograph event, and a video event.

5. The method of claim 1, wherein the timeline is linear, and the one or more user interface elements are distributed along the timeline in a chronological order.

6. The method of claim 1, wherein the timeline is a curve, and the one or more user interface elements are distributed along the timeline in a chronological order.

7. The method of claim 6, wherein a user interface element of the one or more user interface elements for an event having a relatively current temporal attribute is connected to a point at a forefront of the curve, and user interface elements having future temporal attributes are connected to points at back portions of the curve.

8. The method of claim 1, wherein the one or more user interface elements are displayed within a series of strips distributed along an axis perpendicular to the strips.

9. The method of claim 1, wherein the spatial zoom level is dependent on a size of a portion of the timeline selected for display.

10. The method of claim 1, wherein receiving the user input includes receiving a user input selected from a group consisting of a swiping motion of a manipulator in a particular direction along a touchscreen, a pinching or spreading motion of multiple manipulators on the touchscreen, a gestural input on the touchscreen, one or more tapping inputs of the manipulator on the touchscreen, a movement of a cursor control device, a click of a cursor control device button, and a button click and drag of the cursor control device.

11. The method of claim 1, wherein the respective events of the one or more user interface elements are each associated with the respective plurality of attributes selected from a group consisting of the temporal attribute, an event type attribute, an event name attribute, an event originator attribute, an event subject attribute, an event location attribute, and an event description attribute.

12. The method of claim 1, wherein the information included within respective visual representations of the user interface elements associated with newer events includes additional information relative to the information included within the respective visual representations of the user interface elements associated with older events.

13. A device comprising:
a display device; and
a processor configured to:
output, for display by the display device, a graphical user interface that includes a visual representation of a timeline and a visual representation of one or more user interface elements positioned along the timeline, wherein each user interface element of the one or more user interface elements is associated with a respective event, each respective event being associated with a respective plurality of attributes including at least one temporal attribute, wherein each user interface element of the one or more user interface elements is positioned along the timeline and at an apparent depth based at least in part on the temporal attribute associated with the respective event such that user interface elements associated with older events are positioned at a greater apparent depth than user interface elements associated with newer events, wherein a respective visual representation of each user interface element from the one or more user interface elements includes information for a first set of attributes from the respective plurality of attributes associated with the respective event;
receive an indication of a user input to modify a spatial zoom level of the graphical user interface; and
responsive to receiving the indication of the user input:
determine, based on the indication of the user input, a respective updated position along the timeline for each user interface element from at least a portion of the one or more user interface elements;
determine, based on the respective updated position for each user interface element from at least the portion of the one or more user interface elements, a respective second set of attributes from the plurality of attributes associated with the respective event; and
output, for display by the display device and based on the indication of the user input, an updated visual representation of each user interface element from at least the portion of the one or more user interface elements at the updated position along the timeline, wherein each user interface element from at least the portion of the one or more user interface elements includes information for the respective second set of attributes associated with the respective event, wherein the first set of attributes is different from the second set of attributes.

14. The device of claim 13, wherein:
the user input indicates an increase in the spatial zoom level, and wherein the visual representation of the first set of event attributes includes an icon indicating a type attribute for the respective event,
the visual representation of the second set of event attributes includes the temporal attribute indicating a time and a date for the respective event,
the user input is a first user input, and
the processor is further configured to:

subsequent to receiving the indication of the first user input, receive an indication of a second user input to increase in the spatial zoom level; and responsive to receiving the indication of the second user input, output, for display by the display device and based on the indication of the second user input, a further updated visual representation of at least the portion of the one or more user interface elements that includes information for a third set of attributes from the plurality of attributes, wherein the third set of attributes is different from the first set of attributes and the second set of attributes.

15. The device of claim 13, wherein the plurality of attributes includes an event type attribute that is selected from a group consisting of a telephone call event, a social networking event, a calendar event, a text event, an email event, a message event, a photograph event, and a video event.

16. The device of claim 13, wherein the timeline is linear, and the one or more user interface elements are distributed along the timeline in a chronological order.

17. The device of claim 13, wherein the timeline is a curve, and the one or more user interface elements are distributed along the timeline in a chronological order, and wherein a user interface element of the one or more user interface elements for an event having a relatively current temporal attribute is connected to a point at a forefront of the curve, and user interface elements having future temporal attributes are connected to points at back portions of the curve.

18. The device of claim 13, wherein the one or more user interface elements are displayed within a series of strips distributed along an axis perpendicular to the strips.

19. The device of claim 13, wherein the spatial zoom level is dependent on a size of a portion of the timeline selected for display.

20. The device of claim 13, wherein the information included within respective visual representations of the user interface elements associated with newer events includes additional information relative to the information included within the respective visual representations of the user interface elements associated with older events.

* * * * *